June 30, 1931.  J. GRANT  1,812,043
REAMER AND UNDERREAMER
Filed July 19, 1927  3 Sheets-Sheet 1
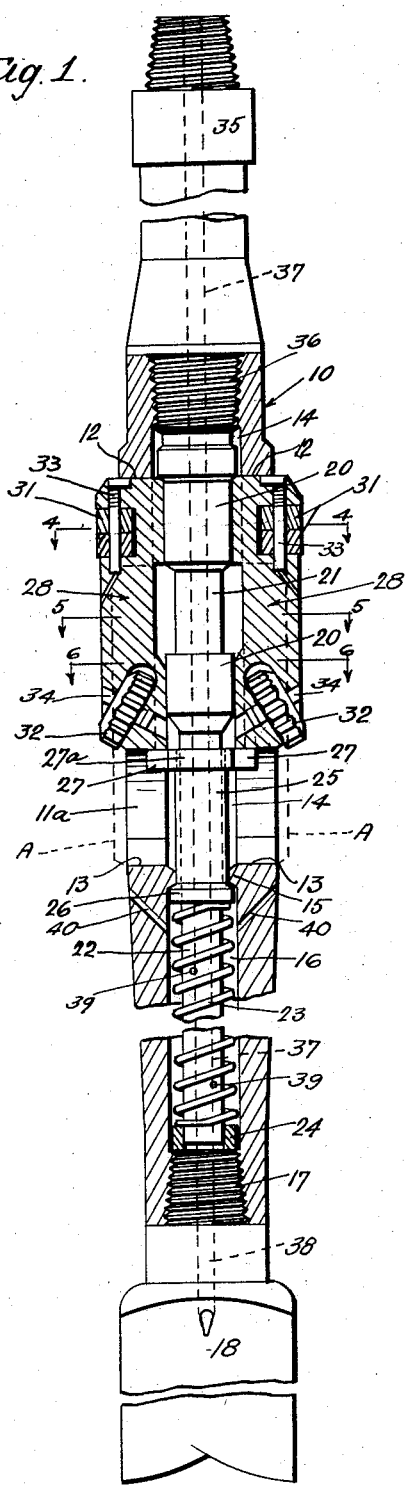
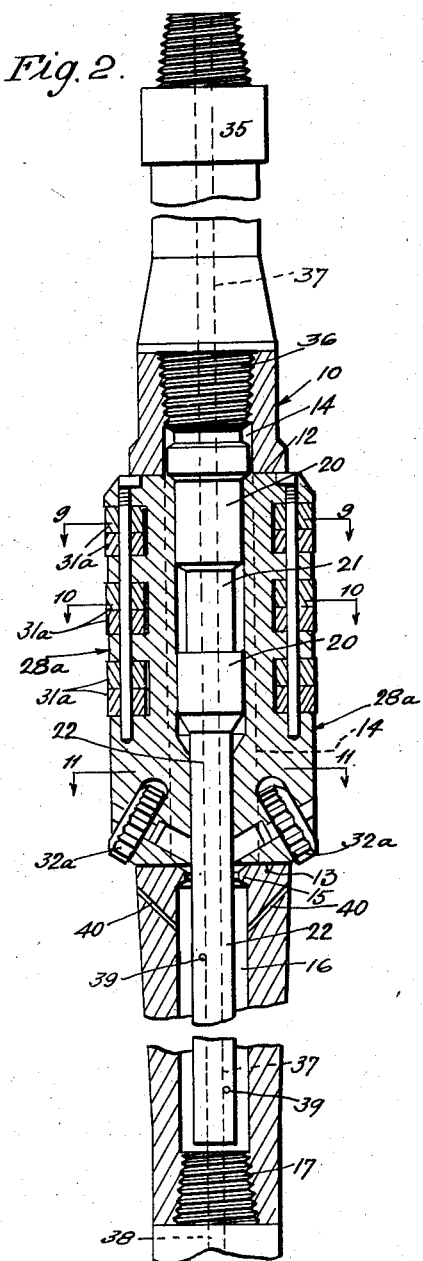
Inventor.
John Grant.
Attorney.

June 30, 1931. J. GRANT 1,812,043
REAMER AND UNDERREAMER
Filed July 19, 1927 3 Sheets-Sheet 2
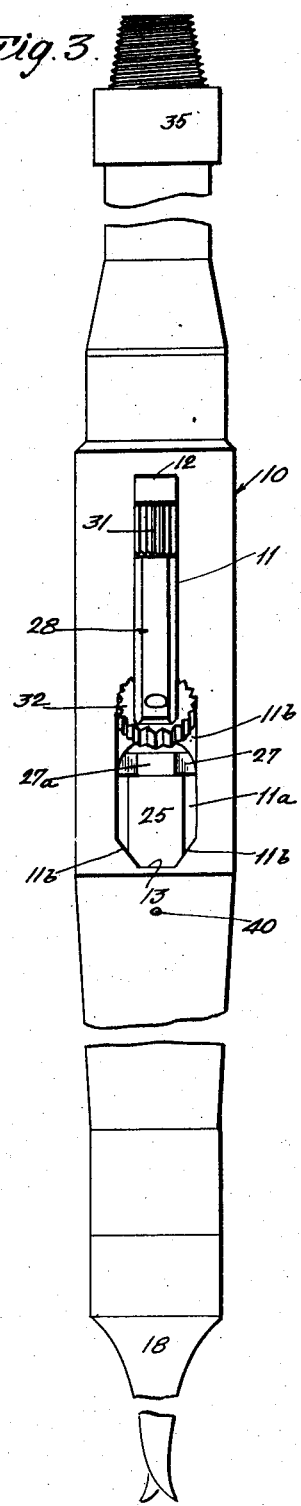
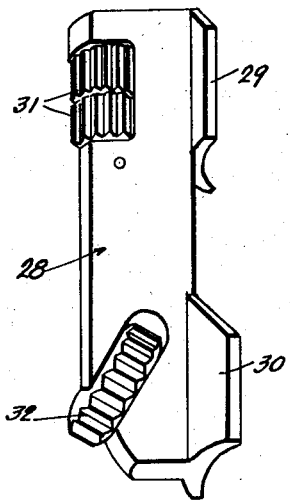
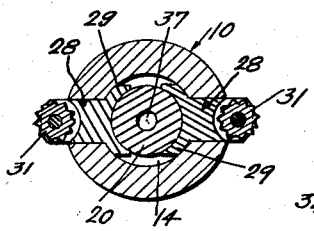
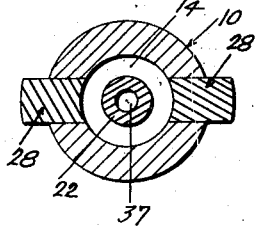
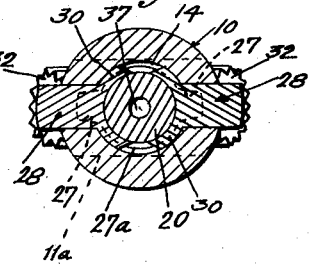
Inventor
John Grant.
Attorney.

June 30, 1931.   J. GRANT   1,812,043
REAMER AND UNDERREAMER
Filed July 19, 1927   3 Sheets-Sheet 3
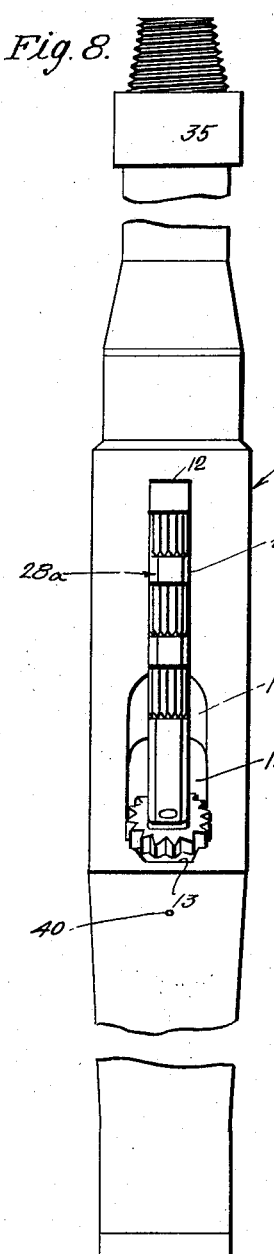
Fig. 8.
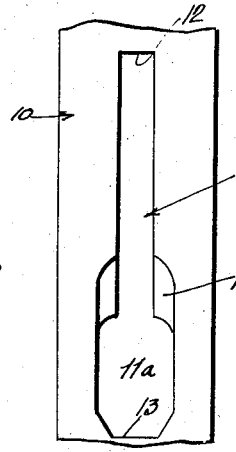
Fig. 14.
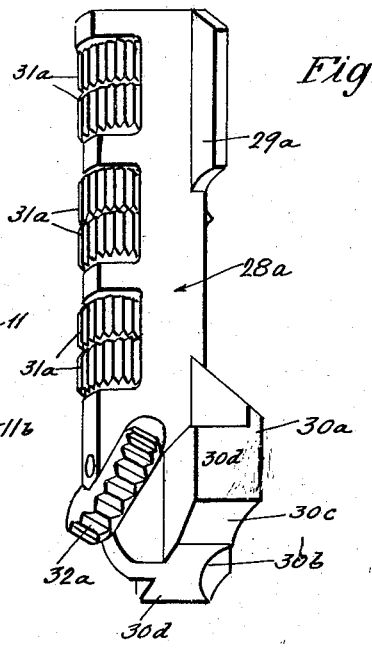
Fig. 12.
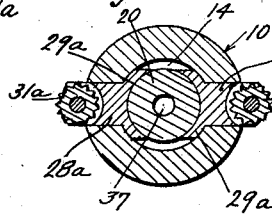
Fig. 9.
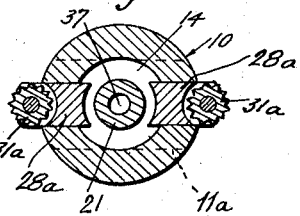
Fig. 10.
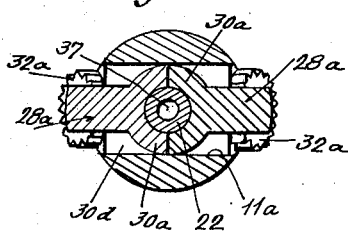
Fig. 11.
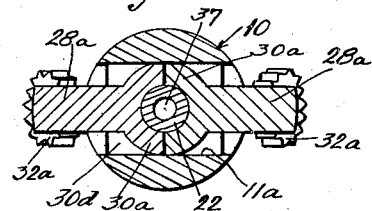
Fig. 13.
Inventor
John Grant.
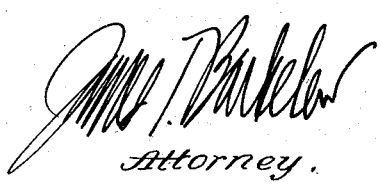
Attorney.

Patented June 30, 1931

1,812,043

UNITED STATES PATENT OFFICE

JOHN GRANT, OF LOS ANGELES, CALIFORNIA

REAMER AND UNDERREAMER

Application filed July 19, 1927. Serial No. 206,817.

This invention has to do with reamers and underreamers such as are used in the drilling of deep wells; and it is not only an object of the invention to provide a construction that is easily changeable so that it may function either as a plain reamer or as an expansible underreamer, but it is also an object to provide certain features of structure and function whereby a reamer (whether expansive or non-expansive) having very desirable qualities is produced. Thus there are several different aspects of my invention which will be explained in typical embodiment in the following detailed description. I conceive the invention to be capable of many different embodiments. Therefore I wish it understood that the following detailed description shall be taken only as illustrative of the invention and not necessarily limitative of it except as expressly stated in the appended claims.

For the purpose of illustrating my present invention I have chosen to use that type of underreamer which is set out in the patents of John T. Phipps, 1,678,073, July 24, 1928, entitled Well apparatus; and 1,678,075, July 24, 1928, entitled Expansible rotary underreamer. In that type of underreamer a relative vertical movement between the cutter carriers and an internal mandrel is utilized for expanding and contracting the cutters; and, specifically in that type, the body of the underreamer is stationary with reference to the expanding mandrel and the cutters move longitudinally with reference to the body, the cutters moving in and projecting through slots in the body wall.

Using this type of expansible underreamer as a typical basis, my present invention provides means whereby such an underreamer may be readily and effectively converted into a plain reamer, and also provides many desirable qualities and characteristics in the resulting plain reamer as well as in the expansible underreamer.

Non-expansive reamers that have been used in the past have several objectionable features, chief among which is the fact that the cutters are necessarily so mounted on the body that they do not project more than a short distance outwardly beyond the body, and the body therefore fills most of the hole which the cutters make. The result is that little room is left around the body for circulation, and also little room for washing around the body or for operating fishing tools in case the reamer is lost in the hole. My invention provides a structure wherein the cutting elements, of whatever form they may be may be supported upon the cutter carriers, at a cutting diameter considerably larger than the body diameter; provides also a structure whereby the cutters are easily interchangeable to change the effective cutting size of the reamer, all on the same body; and also provides for equally facile interchangeability to make an expansible underreamer or non-expansive reamer. And, furthermore, my invention provides, throughout these interchangeabilities, simple, rugged and effective construction.

All of these characteristic features of my invention, together with others, will be readily understood from the following detailed specification wherein I set out a preferred and illustrative form of the invention, reference for this purpose being had to the accompanying drawings, in which—

Fig. 1 is a longitudinal central section showing my mechanism equipped as an expansible underreamer;

Fig. 2 is a similar view showing the mechanism equipped as a plain reamer;

Fig. 3 is a side elevation of the mechanism shown in Fig. 1;

Figs. 4, 5, and 6, respectively, are cross-sections on lines 4—4, 5—5, and 6—6 of Fig. 1.

Fig. 7 is an enlarged perspective of the cutter carrier and cutters, as shown in Fig. 1;

Fig. 8 is a side elevation of the mechanism shown in Fig. 2;

Figs. 9, 10, and 11 are, respectively, cross-sections on lines 9—9, 10—10 and 11—11 of Fig. 2;

Fig. 12 is an enlarged perspective of a cutter carrier and cutters of the form shown in Fig. 2;

Fig. 13 is a section similar to Fig. 11, but showing substitute cutter carriers for making a reamer of larger cutting diameter than that shown in Fig. 11.

Fig. 14 is a fragmentary side view of the reamer body.

In the present preferred type of body and mandrel assembly shown in the drawings the body 10 is generally tubular in form and provided with a plurality of wall slots 11, here shown as a pair of slots arranged opposite each other. The slots extend longitudinally between upper end shoulders 12 and lower end shoulders 13. The body has a main bore 14 which extends down from its upper end. Near the slot shoulders 13 this bore is separated by a shoulder flange 15 from an extension bore 16 which extends to the lower end of the body. The lower end of the body takes the joint pin 17 of drilling bit 18 which is sometimes used in connection with the reamer or underreamer, drilling ahead of the reaming cutters and leaving the hole to be reamed out by those cutters.

A mandrel is inserted in the body from its upper end. This mandrel comprises essentially two spaced relatively enlarged portions 20, and intermediate relatively smaller portion 21, and a lower relatively smaller portion 22, which extends down below the large portion 20, and preferably extends on down through extension bore 16 to form a guide for the cutter propeller and the propeller actuating spring 23. Spring 23 may rest at its lower end on a seat ring 24 which is held in place by bit pin 17. The cutter propeller sleeve 25 slides upon mandrel portion 22 and is moved up by the spring, the propeller sleeve having a collar flange 26 at its lower end which brings up against the shoulder flange 15 when the propeller and cutters are in their uppermost positions. At its upper end the propeller sleeve has a removable spider 27a with two wings or lugs 27 which extend out into body slots 11 and ride up and down in them, forming the supports for the two cutter carriers 28. These cutter carriers are of general flat bar form, having flanges 29 and 30 at their inner edges for engaging the mandrel, and at their outer edges they carry the cutting elements. I shall call each cutter carrier, with its cutting element or elements, a cutter. Such cutting elements may, if desired, be merely in the form of sharp shearing edges on or carried by the cutter carriers; but in the present instance I show these cutting elements as composed of roller cutters 31 and 32. Cutters 31 are preferably mounted on vertical axis pins 33 near the upper ends of the cutter carriers; while elements 32 are mounted on diagonal axis pins 34 so placed that the rolling pressure of the edge of a roller 32 on the strata is directed downwardly and outwardly against the strata, the resultant reaction pressure against the cutter and the cutter carrier being upwardly and inwardly. The specific form of cutting element and carrier make-up here described may be taken as typical of various forms of cutters.

The two flanges 29 and 30 on the inner edges of the cutters are spaced apart and are located one set at the upper end of the cutters and the other set at the lower end of the cutters; so that, with the cutters in their upper and expanded position shown in Fig. 1, the flanges 29 bear upon the upper large mandrel portion 20 and flanges 30 bear upon the lower large portion 20. In this position the outer faces of the flanges bear outwardly against the wall of body bore 14, so that cutters are thus solidly supported and held in their expanded positions. When the cutters are moved relatively downwardly in the slots 11 the lower flanges 30 move down to a position opposite the lower reduced portion 22 of the mandrel and the upper flanges 29 move down to a position opposite the intermediate reduced portion 21 of the mandrel, thereby allowing the cutters to move inwardly in such contracted position as indicated in dotted lines at A in Fig. 1.

The mandrel is removably mounted in the body. At its upper end it is provided with the usual sub 35 for connection with the drilling string. At 36 it has a tapered screw-threaded pin which screws into the upper end of body 10, the mandrel parts which have been hereinbefore described depending from the part 36. Throughout its length the mandrel has a water course 37 which serves to carry water down to the water course 38 of the drilling bit; and at its lower portion ports such as 39 are provided to let water out into bore 16, whence it may flow through the upwardly pointing ports 40 under the cutters so as to keep the cutters washed clear and clean at all times.

The structure so far described is not in itself new to the present invention; the novel features and characteristics are now to be set out.

To disassemble the expansible underreamer which has been described the mandrel is first removed by unscrewing it and moving it longitudinally upwardly. The drilling bit is removed and also spring 23. The propeller and the cutters can then be dropped down to their lowermost positions. In this position the lower flanges 30 of the cutters are opposite the widened parts 11a of slots 11, the propeller wings then being at the lowermost parts of the slots below the widened portions. The lower ends of the cutters are then removed outwardly, passing flanges 30 through those widened parts of the slots; and then, with the cutters in a sort of diagonal position (their lower ends being outside the body while their upper ends are still inside) the cutters can be moved on down until the upper flanges 29 can be moved out through the wide slot parts 11a. The propeller spider 27a is moved up off sleeve 25 and then out through one of the widened slot parts, the sleeve 25 being removed downwardly through bore 16.

The widened slot portions 11a are wide enough to pass the carrier flanges 29 and 30 and also the flanges of the stationary cutters hereinafter described. They are located at or near the bottoms of the slots 11 and their length is commensurate with the length of the cutter flanges. Above portions 11a there are recesses 11b to accommodate cutting rollers 32.

It is noted that the provision of the widened slot portion 11a for removing and inserting the flanged cutters presents several advantages, both as to an expansive underreamer and a non-expansive reamer. The only other method of inserting and removing such cutters is by way of the hollow body interior when the mandrel is removed. Although that method has been used it has its limitations because of the fact that the total width of the cutter, with its cutting rollers and flanges, must be somewhat less than the diameter of the body bore. The thickness of the body wall and the distance by which the cutters may be projected beyond the body is thus somewhat limited. But by making provision for removal and insertion of the cutter carriers through the body slots, the total width of the cutters and the diameter of the body bore are not necessarily restricted with relation to each other. It will be readily understood how this provision is therefore of advantage in an expansive underreamer, in the manner before indicated. The body and its relative size of bore may be designed to obtain a requisite ruggedness and strength. Furthermore the effective cutting diameter of the reamer is not limited with relation to the diameter of the body. The total cutter width may be designed and determined as desired, and the cutting elements may therefore project as far beyond the body exterior as may be desired. And all these advantages inhere to a non-expansive reamer as well as to an expansive underreamer, as will become apparent from the following description of a non-expansive assembly. They not only make possible the interchangeability between the expansive and non-expansive assembly, but also interchangeability for different reaming diameters. And in either assembly, in spite of the fact that cutters are easily removable and insertable, they are always held in place accurately and supported solidly when the mandrel is inserted. With the mandrel in place, it will be readily understood on a consideration of Fig. 1 and Fig. 2 that the lower ends of the carriers cannot be swung outwardly to remove their lower flanged ends through the slot enlargements 11a because the upper flanges are confined between the mandrel and the body wall. The cutters are therefore just as effectively held against loss as they would be if they were removable only through the interior body bore. And they are just as effectively and solidly supported against all drilling strains, because those drilling strains are stresses exerted against the cutters upwardly and inwardly.

With the underreamer disassembled, as described, it can then be reassembled to form the non-expansible reamer shown in Fig. 2. For this purpose a cutter carrier 28a, such as shown in Figs. 2 and 12, is used.

The difference between carrier 28a and carrier 28 lies mainly in difference of length; carrier 28 being of such length that it can move longitudinally in slot 11 so as to expand and contract, and carrier 28a being long enough to fill the entire slot between shoulders 12 and 13. A typical carrier 28a has a body of rectangular or flat bar form with flanges 29a and 30a at its upper and lower ends, respectively, these flanges being of substantially the same longitudinal extent as flanges 29 and 30 of carrier 28; but with this difference: That the lower flange 30a of the carrier 28a has an internal curvature or concavity 30b which fits around the lower reduced portion 22 of the mandrel, whereas the lower flange 30 of carrier 28 fits around the lower enlarged portion 20 of the mandrel. Also lower corners of flange 30 are cut away, as shown at 30c in Fig. 12, so that flange 30a may be passed in and out through the enlarged portion 11a of slot 11, which enlarged portion has diagonal lower corner parts 11b, as shown in Fig. 3. The lower flanges 30a may be of such extent that together they completely encircle the mandrel, as shown in Fig. 11. And the body of carrier 28a may be filled out at its lower end, as shown at 30d, to the full width of flange 30a and the full width of slot portion 11a; so that the carrier will have side support at its lower end by reason of the parts 30d fitting the widened slot portion (see Figs. 11 and 12). The widened slot portion being below the lower mandrel enlargement 20, and the expansive carrier 28 being located entirely above slot part 11a when expanded, it will be seen that this expansive carrier is solidly supported in all directions. And, by making the non-expansive carrier bear on the mandrel below the large part 20, and filling out the carrier 28a to fill the wide part 11a of the slot, that carrier is likewise solidly supported in all directions.

Cutter carrier 28a may be of any selected width dimension—its dimension between its inner edge which bears upon the mandrel, and its outer edge which carries the cutting element. And the cutting elements may be of any desired form, sharp edges upon or carried by the cutter carrier, or separate cutter elements such as the rollers 31a and 32a, similar to rollers 31 and 32 hereinbefore described. Assembled with a given body and mandrel, the width dimension of the whole cutter (carrier and cutting element) determines the diameter of the hole which will be drilled by the reamer.

To assemble such a reamer as shown in Figs. 2 and 8 to 13, it is only necessary to insert the cutters in a manner the reverse of the described operation of removing cutters 28, and then to insert the mandrel in its proper position. The non-expansive reamer assembly shown in Fig. 2 does not include the cutter propeller or the cutter propeller spring, these being omitted from the assembly, as is indicated in Fig. 2. With the assembly made as shown in Fig. 2, the diameter of the bore may be determined as desired. It is one of the practical advantages of my construction and arrangement that a given reamer body and mandrel, accompanied by several different sets of cutters, gives an operator a reaming outfit which may be used for drilling holes of various diameters, it only being necessary to remove and substitute different cutters to obtain different diameters. The facility and economy of such an arrangement is apparent without further explanation. Fig. 13 shows the assembly with a pair of cutters adapted to cut to a larger diameter than the assembly shown in Fig. 11.

Also the non-expansive reamer assembly, as well as the expansible underreamer, has certain desirable structural features. It will be noted that the lower bearing flanges on the cutter carriers 28a are kept at the lower ends of the carriers where they are immediately behind the lower rollers 32a, although those lower bearing flanges bear upon a reduced portion of the mandrel instead of on an enlarged portion. In this relative position the flanges take the cutter thrust directly, supporting the lower rollers 32a solidly and without any binding, twisting or straining actions upon the cutter carriers, or mandrel or body. The cutters are projected a substantial distance beyond the body so that ample space is left around the body for circulation, and for working and fishing. The cutting elements and carriers are easily replaceable when worn, a changing job being performed in the space of a few minutes. The circulation ports 40 perform effectively the same functions for the fixed cutters that they perform for the expansible cutters, keeping the cutting rollers washed clean and allowing them to rotate and cut more freely than would otherwise be the case. This is particularly important where rolling cutters are used. The use of cutter carriers as separate pieces, rather than integral with the body of the reamer, not only gives all the described opportunity for replacement, the change of size, and inter-changeability for expansion, but also affords the advantage that any desirable type of cutting element may be used to suit the formation being drilled. While I have here illustrated cutting elements of the rolling type, it will be readily understood that cutter carriers having cutting elements of various other types may also be used; and an outfit may be provided not only with cutter carriers adapted to ream to various diameters, but may also be provided with cutter carriers having cutting elements of different types and kinds for cutting effectively in various formations. And as an instance of wide latitude of choice in cutting elements, it is to be noted that the use of cutter carriers as separate pieces and which project substantially beyond the body, allows readily the efficient placement of roller cutters at an angle. Such angled roller cutters are found in some instances to give a great deal more cutting efficiency and speed for reaming out a hole, than is given by rollers mounted upon vertical axes. But the rolling cutters on vertical axes are very efficient in cleaning up the reamed hole and are therefore used in combination with the angular rollers. My arrangement allows not only a choice of such a combination but many other types and combinations of cutters as well.

In the non-expansive reamer or assembly the mandrel performs its same general functions as in the expansive assembly. It forms the supporting internal abutment for cutter carriers and also forms the circulation passage which takes circulation through to the lower part of the body and to the drilling bit.

I claim:

1. In a well reamer, the combination of a hollow tubular body with longitudinally slotted walls, a removable mandrel within the body, and cutters removably mounted in and filling the wall slots longitudinally and bearing inwardly against the mandrel, the cutters having flanges bearing outwardly against the inner wall surface of the body and the body wall slots having enlargements at one end to allow outward removal of the flanges.

2. In a well reamer, the combination of a hollow tubular body, the body wall having a longitudinal slot therethrough with a widened end portion, a cutter projecting through the slot, filling it longitudinally, and having a flange adapted to bear outwardly against the inner wall surface of the body and adapted to be passed through the widened slot portion, and a removable mandrel within the body against which the cutter bears inwardly.

3. In a well reamer, the combination of a tubular body, the body wall having therethrough a longitudinally extending slot with a widened portion extending a limited part of its length, a cutter projecting through the slot, filling it from end to end, and having a flange of limited longitudinal extent adapted to be passed through the widened slot portion, said flange bearing outwardly against the inner wall surface, and a removable mandrel inside the body and against which the cutter bears inwardly.

4. In a well reamer, the combination of a tubular body, the body wall having therethrough a longitudinally extending slot with a widened portion extending a limited part of its length near one end, a cutter projecting through the slot, filling it longitudinally, and having a pair of spaced flanges, each of limited longitudinal extent and adapted to be passed through the widened slot portion, said flanges bearing outwardly against the inner wall surface, and a removable mandrel inside the body and against which the cutter bears inwardly.

5. In a well reamer, the combination of a tubular body, the body wall having therethrough a longitudinally extending slot with a widened portion extending a limited part of its length near one end, a cutter projecting through the slot and having a pair of spaced flanges, each near one end of the cutter and of limited longitudinal extent and adapted to be passed through the widened slot portion, said flanges bearing outwardly against the inner wall surface, and a removable mandrel inside the body and against which the cutter bears inwardly.

6. In a well reamer, the combination of a tubular body, the body wall having therethrough a longitudinally extending slot with a widened portion extending a limited part of its length near one end, a removable mandrel in the body extending longitudinally thereof and having two spaced relatively large parts with a relatively reduced part between them and a relatively reduced part opposite the widened slot part, the relatively large mandrel parts being opposite the un-widened part of the slot; and a cutter extending through the slot and having two spaced flanges near its ends each of which is adapted to be passed through the widened slot part.

7. In a well reamer, the combination of a tubular body, the body wall having therethrough a longitudinally extending slot with a widened portion extending a limited part of its length near one end, a removable mandrel in the body extending longitudinally thereof and having two spaced relatively large parts with a relatively reduced part between them and a relatively reduced part opposite the widened slot part, the relatively large mandrel parts being opposite the unwidened part of the slot; and a cutter extending through the slot and having two spaced flanges near its ends each of which is adapted to be passed through the widened slot part, the cutter occupying the whole length of the slot and fitting both the un-widened and the widened slot parts.

8. In a well reamer, the combination of a tubular body, the body wall having therethrough a longitudinally extending slot with a widened portion extending a limited part of its length near one end, a cutter projecting through the slot and having a pair of spaced flanges, each near one end of the cutter and of limited longitudinal extent and adapted to be passed through the widened slot portion, said flanges bearing outwardly against the inner wall surface, and a removable mandrel inside the body and against which the cutter bears inwardly, the cutter occupying the whole length of the slot and fitting both the un-widened and the widened slot parts.

9. In a well reamer, the combination of a hollow body, the body wall having a slot therethrough with a widened portion, a cutter projecting through the slot and having a flange adapted to bear against the inner wall surface of the body and adapted to be passed through the widened slot portion, and a removable mandrel within the body against which the cutter bears inwardly, the cutter occupying the whole length of the slot and fitting both the un-widened and the widened slot parts.

In witness that I claim the foregoing I have hereunto subscribed my name this 6th day of July, 1927.

JOHN GRANT.